(No Model.) 3 Sheets—Sheet 1.
G. ANDERSON.
AUTOMATIC GRAIN MEASURER.
No. 513,697. Patented Jan. 30, 1894.
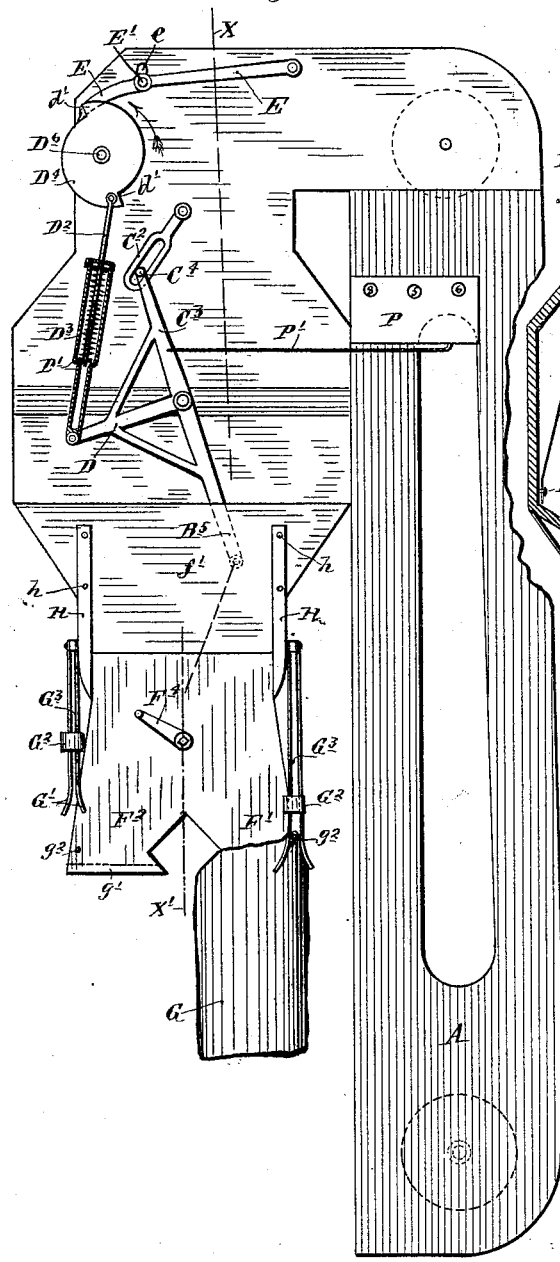
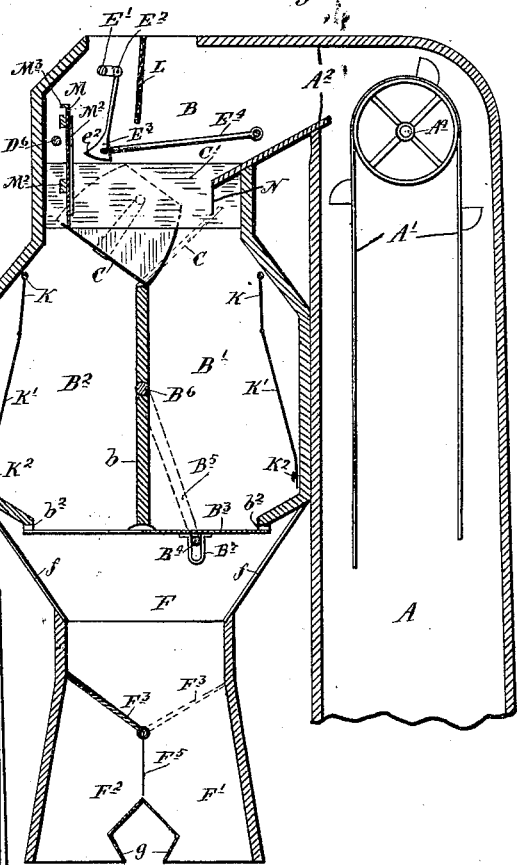

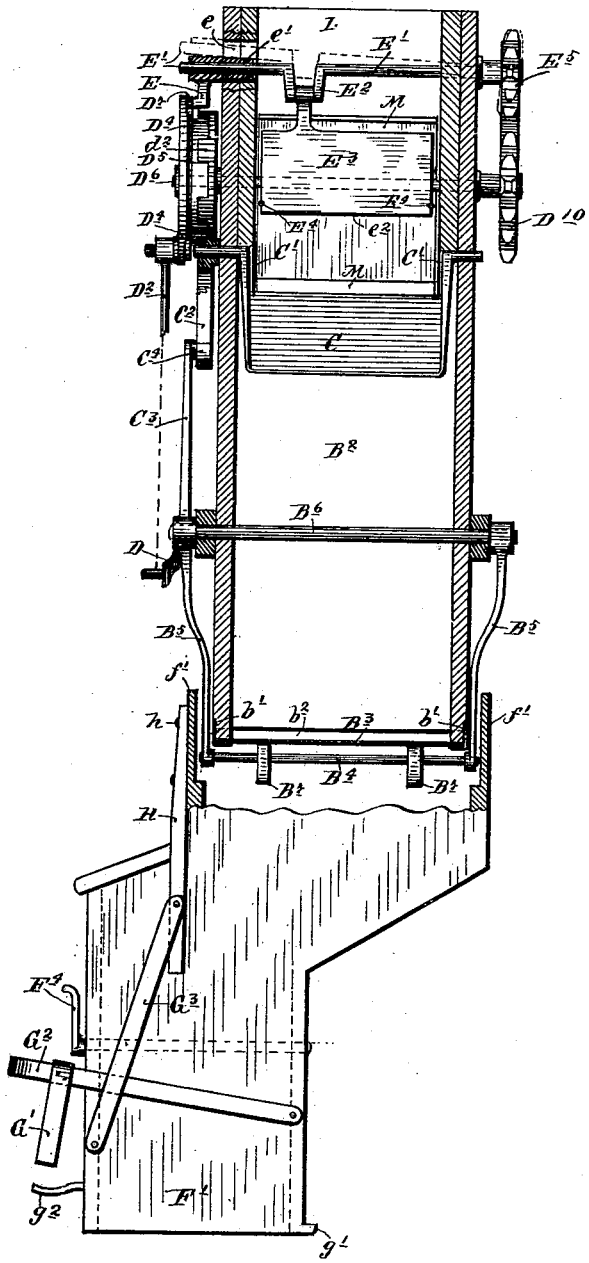

(No Model.) 3 Sheets—Sheet 3.

G. ANDERSON.
AUTOMATIC GRAIN MEASURER.

No. 513,697. Patented Jan. 30, 1894.

Witnesses.
E. F. Elmore
A. H. Opsahl.

Inventor.
Gustav Anderson
By his Attorney.
Jas. F. Williamson.

THE NATIONAL LITHOGRAPHING COMPANY,
WASHINGTON, D. C.

UNITED STATES PATENT OFFICE.

GUSTAV ANDERSON, OF WELLS, MINNESOTA.

AUTOMATIC GRAIN-MEASURER.

SPECIFICATION forming part of Letters Patent No. 513,697, dated January 30, 1894.

Application filed April 22, 1892. Serial No. 430,180. (No model.)

*To all whom it may concern:*

Be it known that I, GUSTAV ANDERSON, a citizen of the United States, residing at Wells, in the county of Faribault and State of Minnesota, have invented certain new and useful Improvements in Grain Measurers and Baggers; and I do hereby declare the following to be a full, clear, and exact description of the invention, such as will enable others skilled in the art to which it appertains to make and use the same.

My invention relates to grain measurers and baggers, of the kind shown and described in my prior patent, issued to me, of date February 2, 1892, numbered 468,091.

My present invention is in the nature of improvements on the construction shown and described in my former patent, with a view of rendering the machine more efficient and reliable in use.

To this end, the invention consists in certain novel features of construction and arrangement of the parts, which will be hereinafter fully described, and be particularly defined in the claims.

A machine embodying my invention is illustrated in the accompanying drawings, wherein, like letters referring to like parts throughout—

Figure 4:
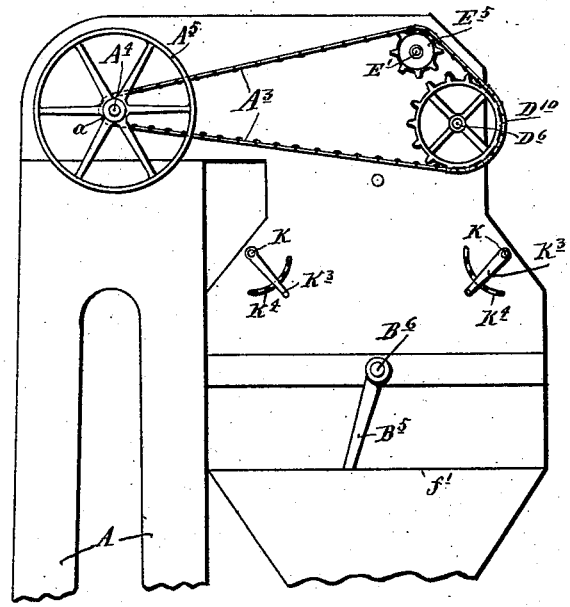
Figure 7:
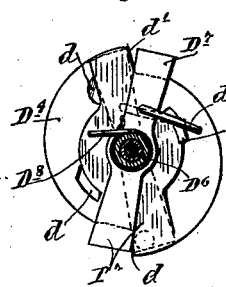
Figure 5:
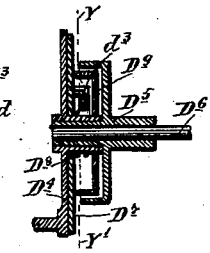
Figure 6:
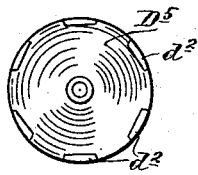
Figure 9:
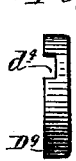
Figure 8:
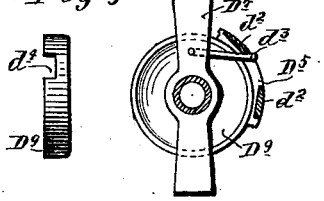

Figure 1 is a front elevation of the entire machine, some parts being broken away. Fig. 2 is a vertical section, taken from right to left, approximately through the center of the machine, some parts being removed and others broken away. Fig. 3 is a vertical section on the line X X' of Fig. 1, looking from the right toward the left, some parts being shown in elevation. Fig. 4 is a rear elevation of the upper part of the machine. Fig. 5 is a sectional view of a part of the trip mechanism. Figs. 6, 7, 8 and 9 are details of the parts shown in section in Fig. 5; of which Fig. 6 is a plan view of the lock disk, detached; Fig. 7 is a section on the line Y Y' of Fig. 5, looking from the right; Fig. 8 is a section on the same line, looking from the left; and Fig. 9 is an edge view of a retaining cup, located between the locking disk, shown in Fig. 6, and the trip lever shown in Fig. 7.

A represents the elevator trunk; A', the elevator; and A$^2$, the elevator hood or delivery head.

B represents the receiving throat; B' and B$^2$, the compartments of the measurer. The two compartments are divided by a central partition, $b$, located below the receiving throat. The compartments are open at the lower ends, and are alternately closed by a sliding valve or bottom plate, B$^3$, which is carried by a cross rod, B$^4$, depending from the hanger arms, B$^5$, which are rigidly secured, at their upper ends, to an idle cross shaft, B$^6$, journaled in the body of the measurer. The valve, or bottom plate, B$^3$, is secured to the rod, B$^4$, by means of elongated keepers, B$^7$, which permit the rod, B$^4$, to have a limited vertical motion within the keepers, as the said valve is moved in the horizontal plane. The said valve or bottom plate, B$^3$, works between the lower edges of the measuring compartments and angle iron flanges, $b'$, which are secured to the side plates of the measurer. The ways thus formed between the lower edges of the walls of the compartments and the said angle irons, hold the said valve or bottom plate to a straight line movement. To insure a tight joint between the walls of the compartments and the said valve or bottom plate, B$^3$, packing strips, $b^2$, of comparatively stiff, flexible meterial, such as rubber, may be secured to the lower edges of the said walls, in position to bear against the plate. These packing strips, $b^2$, make grain tight joints, while yielding under the action of the valve, if necessary; thereby preventing clogging or breakage, and giving the necessary freedom to the movement of the valve.

C is a cut-off or receiving valve, located in the receiving throat of the measure, for directing the grain from the elevator hood, alternately, into the opposite compartments. This cut-off valve, C, has upturned edges, which are journaled in the front and rear walls of the case, and work between the said walls and sheet metal linings, C', thereby securing a grain tight joint between the valve and the walls of the case. The front journal of this valve, C, is extended outward through the case, and is provided with a slotted crank arm, C$^2$, by which, through suitable connections to be noted, the valve is operated.

The front hanger arm, B$^5$, by which the bottom valve, B$^3$, is operated, is, as shown, formed integral with the other lever arms, C$^3$ and D.

The three arms, $B^5$, $C^3$ and D, make up a triangular lever, by which the two valves, $B^3$ and C, are operated to move in opposite directions at the same time, as required for their respective functions. The upper arm, $C^3$, of this triangular lever, is provided with an angular projection, $C^4$, which works in the slot of the crank arm, $C^2$. The central arm, D, of the said triangular lever, is united through a yielding and telescoping connection, $D'$ $D^2$ $D^3$, with a trip-cam, $D^4$. Of the parts of the said connection, from the arm, D, to the trip-cam, $D^4$, the section $D'$ is of tubular form, within which telescopes the section $D^2$ and is yieldingly held by the coil spring, $D^3$, encircling rod $D^2$ on the part of the same, located within the tube $D'$, and having its bearings between the head of the rod and the closed end of the tube. It is obvious that the spring will tend to hold the said telescoping sections in their innermost position, but will permit the same to be drawn outward, if necessary, under strain applied to either of the telescoping sections.

The trip-cam, $D^4$, is loosely sleeved outside the front wall of the case on the hub of the lock disk, $D^5$, which is keyed to and moved with a cam-shaft, $D^6$, journaled in the case, and having its front end extended outward through the front wall of the same. On the rearwardly extended hub of the cam-disk, $D^4$, is loosely pivoted a trip lever, $D^7$, which plays between limiting lugs, $d$, projecting from the rear face of the said cam-disk. The cam-disk, $D^4$, has two shoulders or off-sets, $d'$, between its two cam surfaces, and located at diametrically opposite points. The trip lever, $D^7$, is under spring tension from a coil spring, $D^8$, to turn on the hub of the cam-disk, $D^4$, so as to throw its extremities away from the shoulders or off-sets, $d'$, on the face of the cam-disk; but may be moved in the opposite direction against the strain of the spring, $D^8$, so that the edges of its extremities will lie flush with the radial surfaces of said shoulders. The lock disk, $D^5$, which, as before stated, is rigidly secured to the cam-shaft, $D^6$, is provided on its inner face, with clutch lugs or projections, $d^2$, suitably spaced apart from each other. The trip lever, $D^7$, carries a clutch finger, $d^3$, which projects outward at an angle to the trip lever, and under the pivotal movement of the said trip lever, imparted by its spring $D^8$, will be thrown between the clutch lugs, $d^2$, on the front face of the lock disk, $D^5$, thereby clutching cam $D^4$ to the said lock disk, and cause the cam to be turned with the shaft $D^6$. The clutch finger, $d^3$, works through a slot or guide notch, in one of the lugs, $d$, projecting from the rear face of the cam disk, $D^4$; and together with the trip lever, $D^7$, is held in its proper working position by a retaining cup, $D^9$, which is loosely mounted on the hub of the cam disk, between the lock disk, $D^5$, and the trip lever, $D^7$, and is held from turning, except when the cam disk moves, by a notch, $d^4$, in the cup flange, through which projects at all times, the outer end of the clutch finger, $d^3$. This retaining cup, $D^9$, has no other function except to hold the trip lever, $D^7$, clutch finger, $D^3$, and the spring, $D^8$, in their proper working positions, with respect to the cam disk, $D^4$, and the lock disk, $D^5$.

The hook end of a trip latch, E, pivoted to the front wall of the case, normally engages behind one of the shoulders, $d'$, and the radial edge of one of the extremities of the trip lever $D^7$, and holds the cam disk, $D^4$, in its idle or inactive position, as shown in full lines in Fig. 1. The trip latch, E, is connected, near its free end, to the front end of the packer operating shaft, $E'$, which projects outward through a slot, $e$, in the front wall of the case. The packer shaft, $E'$, is journaled in the rear wall of the case and in the bearing hub, $e'$, formed integral with the latch lever, E, and projecting inward through the slot, $e$, in the front wall of the case. The packer shaft, $E'$, is provided with a crank, $E^2$, to which is attached the depending packer, $E^3$. The lower face or surface of the packer, is expanded, as shown at $e^2$, and its opposite ends are attached to guide rods, $E^4$, which are pivoted at their rear ends to the inner surfaces of the front and rear walls of the case.

The cam-shaft, $D^6$, has on its rear end a sprocket, $D^{10}$, and the packer shaft a smaller sprocket, $E^5$, over both of which sprocket wheels passes a chain, $A^3$, which works over a sprocket, $a$, on the elevator driving shaft, $A^4$. The said shaft, $A^4$, is provided with a pulley, $A^5$, for the application of power.

Directly below the measuring compartments, $B'$ and $B^2$, is located the discharge waste, F, the end walls, $f$, of which, are secured to the end walls of the measuring compartments. The said walls, $f'$, of the discharge waste, are extended outward beyond the side or front and rear walls of the measuring compartments, and stand clear from the same, so as to give a space or clearance for the hanger arms, $B^5$, which operate the valve or bottom plate, $B^3$. The discharge waste, F, terminates in bifurcated discharge chutes or legs, $F'$ and $F^2$, into which the grain is alternately directed by a shunt valve, $F^3$, pivoted in the waist at a point above the junction of the legs, and operated by a hand lever, $F^4$, on the pivot shaft of the valve, $F^3$, outside the front wall of the waist. The pivot shaft of the valve $F^3$, has attached thereto a drop, $F^5$, which is preferably made of some flexible material, but which might be of sheet metal; the purpose of which is to allow the grain to back up from one leg into the other, when the bags become full before they are removed. The discharge legs, $F'$ and $F^2$, are each provided with angularly projecting parts, $g$, at their inner margins, which form retaining surfaces; which co-operate with the flanges or cleats $g'$, projecting from the back margin of the same, and with arm $g^2$, projecting from the outer front corners of the same to support the bags, G, for receiving the grain. The bag is attached by engaging the mouth of the bag over these retaining surfaces $g$ and $g'$, gathering the same at the front and giving it a wrap or twist over the arm, $g^2$. It is then held to the arm by a spring clamp, $G'$, the fingers of which straddle the arm, and the gathered or wrapped part of the mouth of the bag. The clamps, $G'$, are carried on the outer end of the pivoted lever, $G^2$, which works between a pair of guide bars, $G^3$, attached to the end walls of the case. These arms are so spaced apart as to hold the lever $G^2$ under slight friction, sufficient to retain the said lever in whatever position it may be set.

The case constituting the discharge waist and discharge chutes, is conveniently made separate from the body of the measurer, and is detachably connected thereto in any suitable way, as by the hanger arms, H, and the set screws, $h$.

Take-up devices are located inside the compartments $B'$ and $B^2$, to adapt the same to different kinds or conditions of grain. These take-up devices are composed of a pair of pivotally connected sections, K K', of which the upper section, K, is pivoted in the front and rear walls of the case and the lower section, $K'$, is held at its free end by guide lugs, $K^2$, fixed to the walls of the case. This construction permits the free end of the lower section, $K'$, to be raised or lowered, without swinging out into the body of the compartment at its free end. The end walls of the case, containing the measuring compartments, are composed of vertical and inclined sections; and the take-up devices are located so that the joint between the two sections of the same would be approximately in line with the junction between the vertical and inclined sections of the wall of the case. In any event, the point of pivotal attachment for the upper section K, should be directly under the inclined section of the case wall, and at a point above the junction between the inclined and vertical section of the said walls. This construction and arrangement of the take-up device, permits the take-up device to be thrown inward into the compartment at the joint between its two sections, so as to make the largest contraction in the compartment at that point. This leaves downwardly enlarged or flaring walls to the compartment, when the take-up device is thrown inward, which permits the ready passage of the grain. I have found, by actual experience, that with any other construction of take-up device that the grain will clog in the compartments under some conditions, on account of the contraction produced by the take-up device.

L is a deflector, projecting downward from the top of the case into the feed throat, to prevent the grain from being thrown beyond the line of the valve C, by the elevator, thus insuring its drop onto the valve and into the proper compartment.

M is a joint plate, in the form of a vertically movable plunger, held between suitable guides, $M^2$, acting to effect a tight joint between the cut-off valve, C, when the said valve is in the position shown in Fig. 2, for directing the grain into the compartment $B'$. The joint plate, M, is provided with a stop lug, $M^3$, engaging on one of the guides, $M^2$, for limiting its downward movement. If it were not for this joint plate, M, the grain might be thrown over the edge of the valve C, when in the position shown in Fig. 2, and fall through the empty compartment without being measured. The drop N may also be provided at the lower end of the delivery deck from the elevator hood, $A^2$, to insure a grain-tight joint with the right edge of the valve C, when in position to throw the grain into the compartment $B^2$. This, however, is not so necessary, as the edge of the valve would come under the over-reaching part of the deck.

Any suitable registering device, P, may be connected by rod $P'$ with some moving part of the valve operating mechanism, such as the lever arm, $C^3$, for registering the number of measures passed through the machine.

The different parts of the machine have now been specified.

The operation is as follows:—Supposing the parts to be in the positions shown in Fig. 2, the grain as it comes from the elevator, will be directed into the compartment $B'$ until the said compartment is filled, and the grain is backed up into the receiving throat, B. Whenever the grain backs up into the throat, B, to such a point that the packer, $E^3$, will come in contact with the same, the free end of the packer-shaft, $E^2$ and the latch lever, E, will be raised, thereby releasing the trip lever, $D^7$, and the cam-disk, $D^4$. This release will cause the cam-disk, $D^4$, to be clutched to the lock disk, $D^5$, by the clutch finger, $d^3$, carried on the trip lever, $D^7$, under the action of the spring $D^8$. The cam disk will, therefore, then turn with the cam shaft, $D^6$, for one-half a revolution, in which action the hook end of the latch lever will ride on the perimeter or surfaces of the cam disk $D^4$. When the disk has made the half revolution, the other end of the trip lever, $D^7$, and the other shoulder of the cam disk, will be intercepted and engaged by the hook on the end of the latch lever, which action will release or unclutch the cam disk, $D^4$, from the lock disk, $D^5$, and hold the cam disk in its stationary position. By the movement of the cam disk, $D^4$, when clutched to the lock disk, $D^5$, the triangular lever, $B^5 C^3 D$, will be rocked into an opposite extreme position from that shown in Fig. 1, thereby coincidently shifting the bottom plate or valve, $B^3$, so as to close the compartment $B^2$, and the valve C into its opposite position, thereby cutting off the supply from $B'$ and directing the same to $B^2$. When the compartment $B^2$ becomes filled and the grain again backs up into the receiving throat, B, the packer, $E^3$, and the packer shaft will be again lifted, releasing the latch lever and allowing the cam disk to be clutched to the lock disk for another half turn, thereby reversing the motion of the valves and restoring the same into the original position, as shown in Fig. 2. These actions are, of course, continued as often as the compartments become filled. The compartments are made of a size and regulated with the take-up devices to measure some definite quantity, such as a bushel or half-bushel, of grain at a time. If the parts be in the position, as shown in Figs. 1 and 2, the grain, discharged from the measuring compartments, would pass through the waist, F, into the discharge leg, F', until the bag, thereto attached, becomes full. The attendant, if at hand, will then shift the shunt valve, F³, into its dotted line position, so that any further grain discharged from the measurer will pass through the leg F², and into the bag depending therefrom. If the attendant should not happen to be at hand when the bag attached to F' becomes full, the grain will simply back up against the drop, F⁵, and over into the leg, F², and the other bag. This arrangement of the legs F and F², so as to be in communication under the shunt valve, F³, in the discharge waste, is an important improvement; inasmuch as it avoids the clogging of the machine by the backing of the grain into the discharge waste, F.

The yielding connection, between the cam disk, D⁴, and the triangular lever for operating the valves B³ and C, is a safety device to prevent breakage. If this yielding connection, D' D² D³, or some equivalent device were not employed, the valves or some of their parts would have to break in case they should become intercepted by any rigid material. The yielding connection also serves to take up lost motion in the parts.

The take-up devices K K' are set and held in any desired position, by lever-arms K³, applied to the outwardly extended journal of the upper section and engaging with lock-segments K⁴.

It will be readily understood, that the cam disk D⁴ with the stop lugs d', might take other forms. For instance, it might be made in the form of a wheel or disk having side lugs or stops in lieu of the lugs d'.

By actual usage, I have demonstrated the efficiency of the machine.

What I claim, and desire to secure by Letters Patent, is as follows:

1. The combination with the measuring compartments of the sliding bottom for opening or closing the lower ends of the same and the packing strips of flexible material for making a close joint between the said valve and the walls of the said compartments, substantially as described.

2. In a grain measure provided with a pair of measuring compartments and a common feed throat to the same, a cut-off or shunt valve in the said feed throat, consisting of a plate provided with upturned ends working between the front and rear plates of the case and linings on the inner surfaces of the same, substantially as and for the purpose set forth.

3. In a grain measure consisting of a pair of compartments having a common feed throat, the combination with the cut-off or shunt valve located in said throat, of the elevator hood delivering to the said throat and a vertically movable joint plate adapted to form a deflecting surface to prevent the overflow of the grain, and effect a tight joint with the said valve, substantially as described.

4. The combination with the measuring compartments having the common feed throat of the cut-off or shunt valve in the said throat, the sliding bottom alternately closing and opening the bottom of said compartments, a power device for operating the said valves, and connections therefrom to the said valves, some one of which is constructed to yield, substantially as and for the purpose set forth.

5. The combination with the measuring compartments, having a common feed throat, of the cut-off or shunt valve in the said throat, the sliding bottom or valve, alternately closing and opening the lower end of the said compartments, the cam disk for operating said valves, the operating lever for communicating the motion to the said valves, and a yielding connection between the said lever and the said cam disk, substantially as and for the purpose set forth.

6. In a grain measurer, a take-up device consisting of a pair of pivotally connected sections, one member of which is pivoted in the case, and the other or free member of which is mounted with freedom for vertical movement and restrained from lateral movement, whereby, when the said take-up device is extended, to contract the measure, the discharge walls will flare downward and prevent clogging.

7. The combination with the measuring compartments having walls composed of vertical and inclined sections, with the latter located above the former, of the take-up device consisting of a pair of pivotally connected sections, the upper member of which is pivoted to the case directly under the inclined section of the same, and the lower member of which is mounted with freedom for vertical movement and restrained against lateral movement away from the case, substantially as and for the purposes set forth.

8. In a grain measurer, the combination with the valves for controlling the inlet and discharge to and from the measuring compartments, of a power driven shaft provided with a cam disk and connections therefrom for operating the said valves, of a lock disk rigidly secured to said shaft, facing the cam disk, a trip lever on the inner face of the cam disk under spring tension to turn on the same, and a trip finger carried by the said blade adapted to be thrown into the path of the lugs on the said lock disk when the trip lever is released, substantially as described.

9. The combination with the measuring compartments, B' B², having the common supply throat B, of the valves B³ and C, valve operating connections, such as B⁵, C², C³, D, a constantly running shaft as D⁶, the lock disk D⁵ or rigid clutch member keyed thereto, the loose cam disk D⁴, forming the other clutch member, provided with the shoulders $d'$, the pivoted trip lever D⁷, under tension from spring D⁸, and carrying the clutch finger $d^3$ engageable with the clutch lugs $d^2$ of the lock disk D⁵, the latch lever E, normally engaging the trip lever and a shoulder of the cam disk, the vertically movable packer shaft E' carrying the free end of said latch lever, and the packer E³, carried by the shaft E', and serving to release the latch lever E from said cam disk D⁴ and trip lever D⁷, upon the accumulation of grain in the feed throat, substantially as described.

10. In a grain measurer, the combination with the valves B³ and C, for controlling the supply and discharge of grain to and from the measuring compartments, of a constantly running shaft, a loose clutch member engageable with a rigid clutch member on said shaft to operate the said valves, and valve operating connections from said loose clutch member having as one of their elements the sectional telescoping rod D' D², the two members of which are yieldingly held in their closed positions by the spring D³, substantially as described.

11. In the grain measurer, as described, the combination with the valves B³ and C, of the slotted arm C², the hanger B⁴ B⁵ B⁶, the lever arm C³ provided with a projection C⁴ working in the slot of the arm C², and provided with the arm D, the loose cam disk D⁴, forming one member of a clutch for operating the valve from a constantly running shaft D⁶, and the yielding telescoping connection D' D² D³, connecting the said arm D with said cam disk D⁴, substantially as and for the purposes set forth.

12. In a grain-meter, the combination with suitable devices for controlling the inlet and discharge, to and from the measuring compartments, of an idle cam-disk or stop-wheel with connections therefrom, for operating said inlet and discharge controlling devices, a constantly driven lock-disk facing said cam-disk, a trip-lever under spring tension to move in the direction of the lock disks revolutions, and a trip finger carried by said trip lever, adapted to be thrown into the path of the lugs on the said lock-disk, when the trip-lever is released, substantially as described.

In testimony whereof I affix my signature in presence of two witnesses.

GUSTAV ANDERSON.

Witnesses:
A. H. OPSAHL,
JAS. F. WILLIAMSON.